United States Patent [19]

Shenoi

[11] Patent Number: 5,413,129
[45] Date of Patent: May 9, 1995

[54] APPARATUS AND METHOD FOR REMOVING HYDROCARBONS FROM SOILS AND GRAVEL

[75] Inventor: Noel A. Shenoi, Houston, Tex.

[73] Assignee: Worldwide Remediation, Inc., Houston, Tex.

[21] Appl. No.: 32,796

[22] Filed: Mar. 16, 1993

[51] Int. Cl.⁶ .............................................. B08B 3/10
[52] U.S. Cl. ..................... 134/65; 134/111; 134/105; 134/132; 134/102.1
[58] Field of Search ............ 134/105, 107, 108, 102.1, 134/111, 65, 132, 201, 19, 109

[56] References Cited

U.S. PATENT DOCUMENTS

| | | | |
|---|---|---|---|
| 1,564,187 | 12/1925 | Ahrens | 134/104.4 X |
| 1,967,028 | 7/1934 | Howe | 134/109 |
| 2,612,178 | 9/1952 | Skinner | 134/132 |
| 2,909,872 | 10/1959 | Kearne et al. | 134/132 X |
| 2,969,294 | 1/1961 | Shyne | 117/119.2 |
| 3,117,031 | 1/1964 | Griffiths | 134/132 X |
| 3,152,979 | 10/1964 | Bichard | 208/11 |
| 3,443,885 | 5/1969 | Scholtus | 134/98.1 X |
| 4,016,003 | 4/1977 | Stauffer | 134/105 |
| 4,132,010 | 1/1979 | Deland | 134/123 X |
| 4,154,624 | 5/1979 | Wahl et al. | 134/105 |
| 4,208,285 | 6/1980 | Sample, Jr. | 210/180 |
| 4,354,513 | 10/1982 | Bingham | 134/104.4 X |
| 4,398,551 | 8/1983 | Moorehead | 134/104.4 |
| 4,460,292 | 7/1984 | Durham | 405/129 |
| 4,546,783 | 10/1985 | Lott | 134/109 |
| 4,585,753 | 4/1986 | Scott | 502/401 |
| 4,595,422 | 6/1986 | Hill et al. | 134/105 X |
| 4,612,712 | 9/1986 | Pescatore et al. | 134/105 X |
| 4,678,558 | 7/1987 | Belluteau | 208/390 |
| 4,682,613 | 7/1987 | DeLoach | 134/58 |
| 4,778,628 | 10/1988 | Saha | 252/633 |
| 4,780,239 | 10/1988 | Snyder | 252/184 |
| 4,781,944 | 11/1988 | Jones | 427/228 |
| 4,789,475 | 12/1988 | Harte | 210/502.1 |
| 4,804,420 | 2/1989 | Johnson et al. | 134/105 X |
| 4,836,302 | 6/1989 | Heilhecker | 175/66 |
| 4,844,106 | 7/1989 | Hunter et al. | 134/111 X |
| 4,873,789 | 10/1989 | Plattner | 134/9 |
| 4,919,570 | 4/1990 | Payne | 134/62 X |
| 4,998,848 | 3/1991 | Hansen | 405/128 |
| 5,054,506 | 10/1991 | Shakeri | 134/111 |
| 5,107,874 | 4/1992 | Flanigan et al. | 134/105 X |
| 5,133,249 | 7/1992 | Zittel | 134/132 X |
| 5,172,709 | 12/1992 | Eckhardt et al. | 134/102.1 |
| 5,190,065 | 3/1993 | Kovac et al. | 134/111 |
| 5,192,435 | 3/1993 | Francisco, Jr. | 210/400 X |
| 5,255,859 | 10/1993 | Peacock et al. | 134/111 |
| 5,288,330 | 2/1994 | Ballard | 134/25.1 |
| 5,316,029 | 5/1994 | Campbell | 134/104.1 |

FOREIGN PATENT DOCUMENTS 54-1970  1/1979  Japan ............................ 134/104.4

OTHER PUBLICATIONS

McCabe, et al., "United Operations of Chemical Engineering", Third Edition, 1976, pp. 621 and 956.
Perry, et al., "Chemical Engineers' Handbook", Fifth Edition, 1973, pp. 19-43 -19-60.

Primary Examiner—Frankie L. Stinson
Attorney, Agent, or Firm—Larry Mason Lee

[57] ABSTRACT

A transportable apparatus that can be utilized for on-site removal of contaminating hydrocarbons from gravel and soils. The apparatus functions by depositing the gravel and soils as a layer onto a specially constructed belt or screw conveyor which operates so that gravel and soils are not only conveyed through an exposure to multiple overhead steam nozzles or jets, but also agitated to separate the individual particles so that each particle's entire surface is exposed to superheated steam. The superheated steam volates the lighter hydrocarbons and thins the heavier hydrocarbons. The volatilized hydrocarbons are evacuated from the conveyor and condensed to liquid form. The thinned heavier hydrocarbons are discharged with the gravel and soils into a sump, where the hydrocarbons are captured. The clean gravel and soils are removed from the apparatus by a loader.

2 Claims, 3 Drawing Sheets

APPARATUS AND METHOD FOR REMOVING HYDROCARBONS FROM SOILS AND GRAVEL

SUMMARY OF THE INVENTION a. Field of the Invention

The present invention relates generally to the field of apparatus and methods for cleaning loose fill media such as gravels, sands, and soils.

More particularly, the present invention relates to apparatus for cleaning hydrocarbons from loose fill media.

Yet more particularly, the present invention relates to apparatus and methods to remove hydrocarbons from loose fill media which are drill cuttings generated from downhole oil and gas drilling operations.

b. Background of the Invention

A substantial need exists for an apparatus and method for cleaning loose fill media such as gravels, sands, and soils.

An additional need exists for such above-described apparatus and method for cleaning hydrocarbons from loose fill media such as gravels, sands, and soils.

A yet further need exists for an apparatus and method to remove hydrocarbons from loose fill media which are drill cuttings generated by downhole oil and gas drilling operations.

Accordingly, it is a primary object of this invention to provide an apparatus for cleaning loose fill media such as gravels, sands, and soils.

It is another object of this invention to provide a method of cleaning loose fill media such as gravels, sands, and soils.

It is yet another object of this invention to provide an apparatus for cleaning hydrocarbons from loose fill media such as gravels, sands, and soils.

It is yet another object of this invention to provide a method for cleaning hydrocarbons from loose fill media such as gravels, sands, and soils.

It is yet another object of this invention to provide an apparatus for cleaning hydrocarbons from loose fill media such as gravels, sands, and soils which are drill cuttings generated by downhole oil and gas drilling operations.

It is a further and final object of this invention to provide a method for cleaning hydrocarbons from loose fill media such as gravels, sands, and soils which are drill cuttings generated by downhole oil and gas drilling operations.

DESCRIPTION OF THE PREFERRED EMBODIMENT

Figure 1:
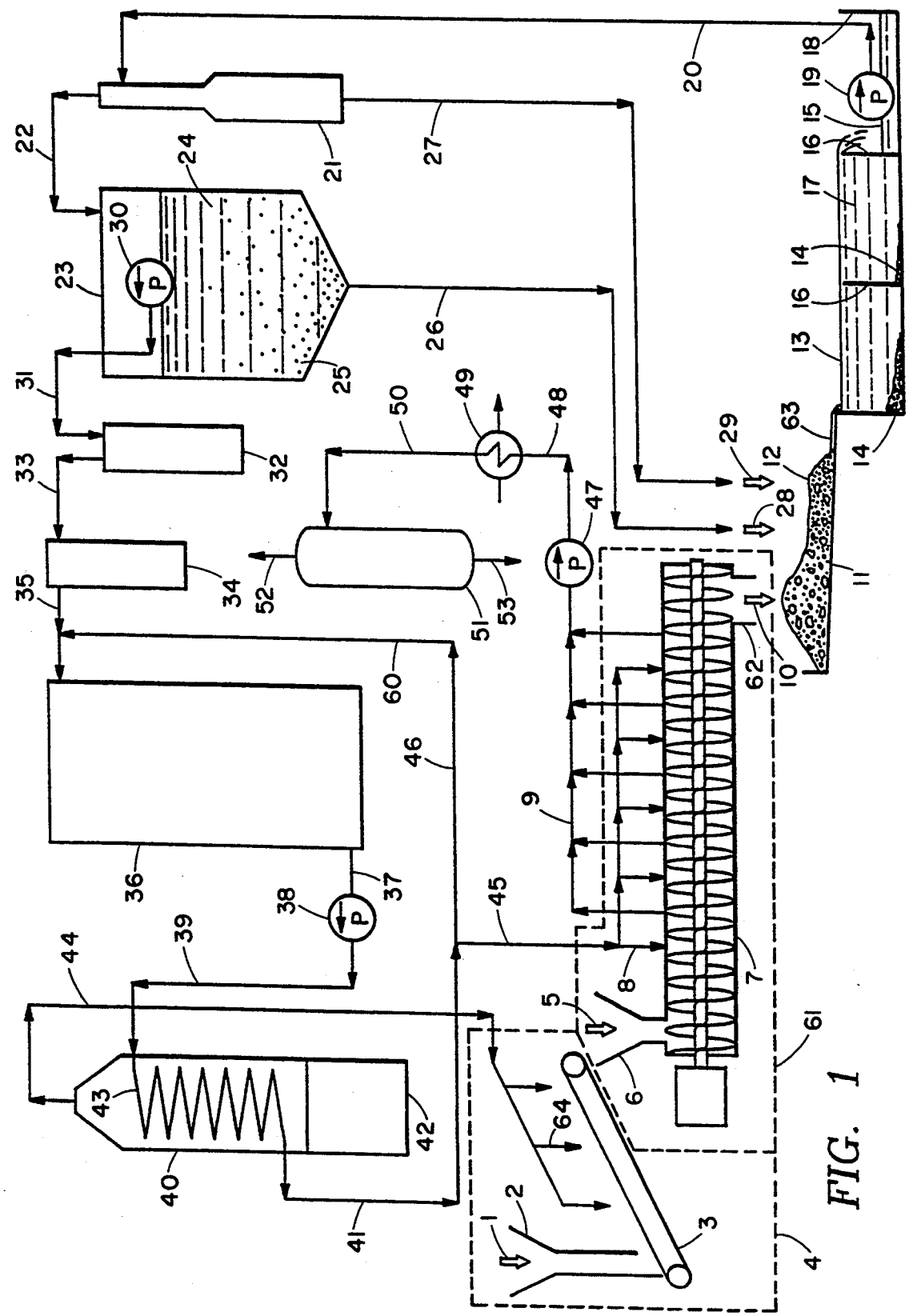
FIG. 1 is a partially schematic diagram illustrating the process and apparatus of the preferred embodiment of the invention.

As seen in FIG. 1, material flow through the apparatus of the instant invention begins with soils and gravels from covered or uncovered storage being inserted (1) into the gravel washing system hopper (2). The soil is extracted from the bottom of the gravel washing system hopper (2) by a screw or belt conveyor (3), which may be either horizontal or inclined, which has a variable speed and which controls the process rate. The screw or belt conveyor (3) has a weight cell mounted on it which provides instantaneous and totalized soil throughput data.

After the soil is inserted (1) into the gravel washing system hopper (2), it is conveyed by screw or belt conveyor (3) which drops (5) the soil into the input hopper (6) of the primary treatment unit (61). The screw conveyor (7) of the primary treatment unit (61) is provided with solid or ribbon flights with backmix paddles to lift the soil and thoroughly mix it with the superheated steam jets provided by the externally mounted steam nozzles (8). The flights aid in breaking up the soil and opening up surface area to the heat to volatilize the lighter hydrocarbons and thin the heavier hydrocarbons. The heated soils (12) exit (10) the end of the primary treatment unit (61) and are fed by a chute (62) to a clean product sump area (11), where free moisture (63) is removed by gravity separation. The cleaned heated soils (12) are then transported via a front-end loader to a clean storage area for testing.

Figure 2:
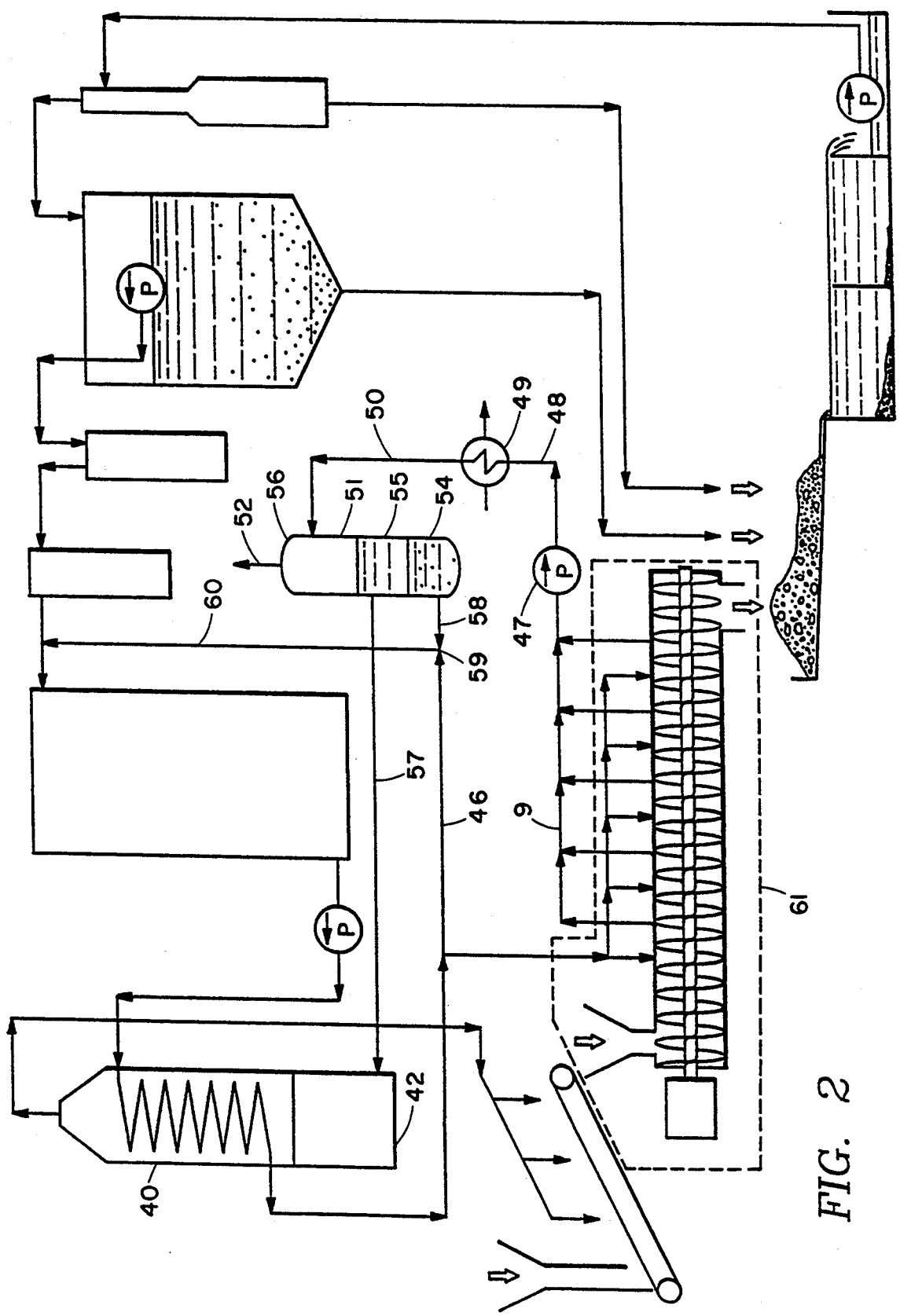
FIG. 2 is a partially schematic diagram illustrating the process and apparatus of an improvement to the preferred embodiment of the invention.

FIG. 2 differs from FIG. 1 in that FIG. 2 depicts the additional elements that may be added to the apparatus of FIG. 1 in order to recycle the hydrocarbons (55) and the water (54) that are condensed from the steam used to clean the soil (5). As seen in FIG. 2, the hot vapors containing volatilized hydrocarbon contaminants in the primary treatment unit (61) are evacuated by the vacuum pump (47) through a connector (9) and passed through a connector (48) to a condenser (49), through another connector (50) and into a hydrocarbon separation tank (51), where the vapors (56) of water and hydrocarbons are condensed to their respective liquid forms (54), (55). The condensed liquids (54), (55) are collected in a hydrocarbon separation tank (51) which separates the hydrocarbon (55) and water (54) phases. The hydrocarbon phase (55) is periodically removed through connector (57) and reused as fuel in the burners (42) of the heater (40).

In both FIG. 1 and FIG. 2 it is seen that the moisture (63) removed by gravity separation from the cleaned heated soils (12) is pumped out of the water recovery sump tank (18) by a sump pump (19). The sump pump (19) operates on electric power and is designed for economical intermittent duty, suitable for emptying sumps. The sump pump (19) may be utilized for automatic operations by utilization of a float switch on the sump pump (19) which starts the sump pump (19) when the water (15) level in the water recovery sump tank (18) reaches a preset depth. The float switch of the sump pump (19) can be bypassed for manual operation. The inlet of the sump pump (19) is designed to reduce the possibility of large solids entering the sump pump (19). The sump pump (19) may also have automatic thermal protection from overheating.

The soils and condensed water exit the primary treatment unit (61) and are introduced via a chute (62) into the clean product sump area (11). The water recovery sump tank (18) contains one or more baffles (16) to slow down the velocity of liquid in the water recovery sump tank (18). Due to the long retention time in the water recovery sump tank (18), large particulate materials (14), sink to the bottom of the water recovery sump tank (18) and liquid (13), with a few separable solids, cascades over the baffles (16) into the area with the sump pump (19). Debris and floating pieces of wood are separated by the baffles (16) and are periodically removed.

The sump pump (19) is used to pump liquid, containing solids, into a heavy particle separator (21) via connector (20). The heavy particle separator (21) selected for the preferred embodiment is a centrifugal vortex separator, such as the Lakos Separators made by Claude Laval Corporation of Fresno, Calif. The centrifugal vortex separator is designed with tangential entry into the acceptance chamber. Upon tangential entry, the liquid/solids are drawn through internal tangential slots and accelerated into the reduced diameter separation cylinder. Solids heavier than the carrying liquid are centrifugally spiralled down the perimeter of the separation cylinder past the deflector stool and allowed to accumulate in the separator's collection chamber. The liquid (free of separable solids, which are primarily those above 74 microns in size) will follow the vortex created and centered on the deflector stool up through the interior of the separation cylinder and into the vortex finder which becomes the separator outlet. Separable solids that collect in the collection chamber are periodically or continuously purged from the heavy particle separator (21) out into the clean product sump area (11) through connector (27).

The liquid output, free of separable solids, of the heavy particle separator (21) flows through connector (22) into a conical bottom separator tank (23) for further filtration of fine particles (25) by gravity. Another sump pump (30) is used to transfer, through connector (31), the top layer of liquid (24) from the conical bottom separator tank (23) through a microfine particle filter (32) and, through connector (33), an activated carbon filter (34) for final organic contaminant removal and thence through connector (35) to the feed water storage tank (36).

The conical bottom separator tank (23) is of large size and has a conical bottom, hence its name. Due to the large size of the conical bottom separator tank (23), and the long retention time of liquid in the conical bottom separator tank (23), particles of size greater than 30 microns separate from the liquid in the conical bottom separator tank (23) and sink into its conical bottom, which acts as a collector of separated solids. Periodically or continuously, the separated solids, mostly above 30 microns, are purged through connector (26) out of the conical bottom separator tank (23) into the clean product sump area (11).

The sump pump (30) is similar in operation to the sump pump (19) in the water recovery sump tank (18). The sump pump (30) is usually kept in the automatic optional mode and is used to pump liquids from the conical bottom separator tank (23) through connector (31) to the microfine particle filter (32), then through connector (33) to the activated carbon filter (34), and then through connector (35) to the feed water storage tank (36).

The microfine particle filter (32) is a cartridge, bag or screen filter media system that removes particulates in size greater than 1-10 microns. The unfiltered liquid passes through a microfine mesh cartridge, bag, or screen that is sealed in a filter housing. Particles in size greater than 1-10 microns are filtered out by the filter media. The filtered liquid exits the microfine particle filter (32) through connector (33) and then enters the activated carbon filter (34). Periodically, when a design pressure drop across the microfine particle filter (32) housing is reached, the cartridge, bag, or screen filter media must be replaced or sufficiently cleaned and replaced.

The activated carbon filter (34) contains activated charcoal to remove all remaining traces of hydrocarbons, including heavier hydrocarbons, in the liquid. The activated carbon filter (34) media is either in cartridge or loose form. Liquid flow moves through connector (33) into the housing of the activated carbon filter (34) in an upwards direction and through the activated carbon filter (34) media, thus allowing maximum contact with the activated charcoal. The filtered water exits the activated carbon filter (34) through connector (35) and flows into the feed water storage tank (36). Periodically, when a design pressure drop across the activated carbon filter (34) housing is reached, the activated carbon filter (34) media must be replaced or sufficiently cleaned and replaced.

The feed water storage tank (36) acts as a storage tank for water to be used in generating steam for the gravel or soil washing process. The outlet of the feed water storage tank (36) is near the bottom of the feed water storage tank (36) to allow maximum flow of liquid through connector (37) out of the tank.

A pump (38) is used to pump water from the feed water storage tank (36) through connectors (37) and (39) to the heater (40) to make steam. The pump (38) is a high pressure duplex or triplex plunger positive displacement pump that is coupled directly or indirectly to a motor or engine. Water enters the pump (38) inlet through connector (37) at low pressure, usually less than 5 psi, and is discharged through connector (39) at pressures around 400-1500 psi. A safety relief device is placed in the pump discharge line, connector (39), to protect the pump (38) and system from sudden blockage in the pump (38) discharge while the pump (38) power source is still operating. The pressurized water discharge from the pump (38) is superheated into steam in the heater (40).

The heater (40) core consists of a heavy gauge steel coil (43) through which water is pumped by the pump (38). A burner (42) is located below the heavy gauge steel coil (43) and heated air rises and passes around the heavy gauge steel coil (43). The water in the heavy gauge steel coil (43) absorbs the heat and is vaporized. Since the pressure of the water is around 400-1500 psi, the steam is superheated to 350-1000 degrees Fahrenheit, depending on the inlet water flow rate and temperature. A thermostat controls the discharge temperature of the steam output from the heater (40) and turns off the burner (42) when not needed. The exhaust stack of the heater (40) is piped through connector (44) to the preheater unit (4) to provide heated air (over 600 degrees Fahrenheit) through exhaust nozzles (64) as a means to preheat soils (1) input to the invention.

The contaminated soil is introduced (1) via a front-end loader into the preheater unit gravel washing system hopper (2). Once inside the gravel washing system hopper (2), the soil (5) is transported via a screw or belt conveyor (3) to the input hopper (6) of the primary treatment unit (61). Soil residence time in the preheater unit (4), comprising a hopper (2), a screw or belt conveyor (3), and exhaust nozzles (64), is approximately 1-2 minutes. The soil is at all times in contact with heated air (over 600 degrees Fahrenheit) that is blown through the exhaust nozzles (64) into the preheater unit (4). The temperature of the soil is increased dramatically prior to the soil exiting the preheater unit. The heated air is obtained from the exhaust stack of the water heater (40). Preheated soils (5) are conveyed by screw or belt conveyor (3) into the input hopper (6) of the primary treatment unit (61).

High pressure superheated steam exits the heater (40) and is piped through connector (41) into the screw conveyor (7) cover. The steam is jetted through multiple precision machined orifice steam nozzles (8) onto the soils in the screw conveyor (7) of the primary treatment unit (61). The screw conveyor (7) uses the screw principle to impart directional forces onto the soils and move them in one direction. Backmix paddles are added to the screw of the screw conveyor (7) for additional mixing of soil (5) and steam. The invention could optionally use a belt conveyor in lieu of the screw conveyor (7) of the preferred embodiment. A belt conveyor uses a track to move soils. Air vibratory equipment would be used to bounce soils on the belt to enhance mixing with the steam.

As the screw conveyor (7) conveys the soils, the steam jets from the steam nozzles (8) penetrate deeply into the soils. The purpose of this portion of the invention is to provide a heat source that the hydrocarbon contaminated soils will come into contact with in order to separate and volatilize the hydrocarbon contaminants from the soil. The large amount of latent heat provided by the superheated steam jets is imparted onto the surfaces of the soils. Temperatures of the soil exiting the screw conveyor (7) will range from 300 degrees to 700 degrees Fahrenheit. At these temperatures, hydrocarbons volatilize into the vapor phase and are evacuated through connector (9) by the vacuum pump (47) from the screw conveyor (7).

The vacuum pump (47) is a centrifugal pump that creates a mild vacuum in the screw conveyor (7) through connector (9). The mild vacuum evacuates volatilized hydrocarbons from the screw conveyor (7) trough. The vacuum pump (47) discharges the evacuated vapors through connector (48) to a condenser (49). The condenser (49) condenses water/hydrocarbon vapors in a single or multiple shell and tube heat exchanger. In the preferred embodiment, the vacuum pump (47) discharges the evacuated vapors through connector (48) to the tube side of the condenser (49). Liquid, preferably water from the feed water storage tank (36), is pumped through the shell side of the condenser (49). The heat from the vapors flowing into the condenser (49) passes to the liquid on the shell side of the condenser (49). The cooled vapors output from the condenser (49) flow through connector (50) into the hydrocarbon separation tank (51). In the hydrocarbon separation tank (51), the hydrocarbons (55) condense into a liquid form from the vapors (56). The condensed hydrocarbons (55) float in the hydrocarbon separation tank (51) and are periodically drained through connector (53) into a container for proper environmental disposal or through connector (57) to the fuel tanks of the burner (42) for the heater (40) to be recycled and used as fuel for heating the water into superheated steam. The water (54) from the bottom of the hydrocarbon separation tank (51) is periodically drained through connector (53) into a container for proper environmental disposal or through connector (58) into the feed water storage tank (36). After the hydrocarbons and water have condensed from the cooled vapors (56) in the hydrocarbon separation tank (51) the hydrocarbon-free vapors (52) exit the hydrocarbon separation tank (51).

The water required to make steam for the process of the instant invention is obtained from the bottom of the feed water storage tank (36) through connector (37). The filtered liquid output of the feed water storage tank (36) is fed through connector (37) to a pump (38) which then pumps the filtered liquid at a high pressure through connector (39) to the heavy gauge steel coil (43) of one or more heaters (40) to make superheated steam which proceeds through connector (41) to be injected via steam nozzles (8) into the primary treatment unit (61).

The entire apparatus of the preferred embodiment is skid mounted, and transportable by truck or other means to the site of the soils which are to be decontaminated of hydrocarbons.

Figure 3:
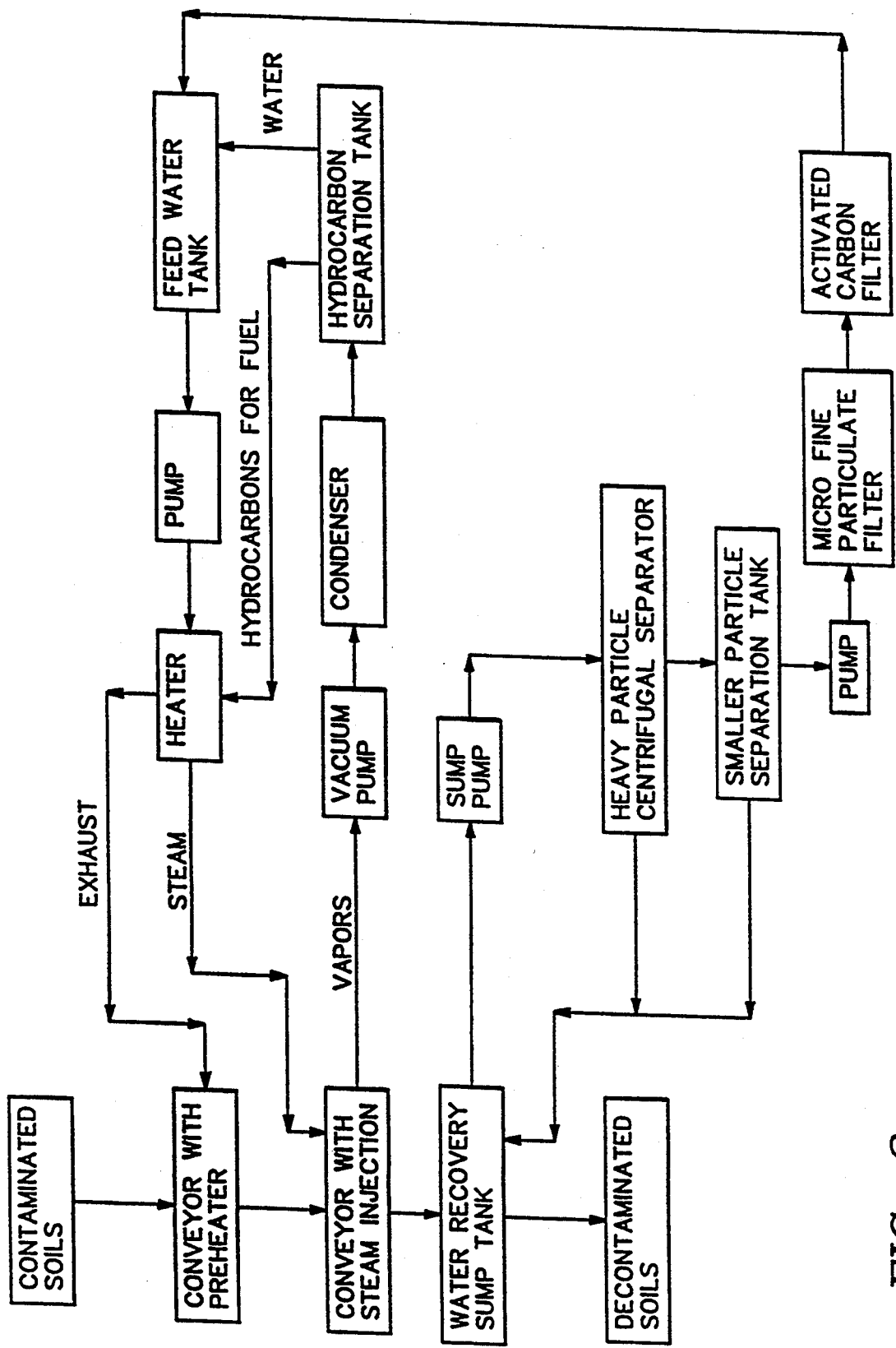
FIG. 3 is a flow diagram illustrating the preferred procedure to be followed in the practice of the method of the invention.

FIG. 3 is a flow diagram illustrating the method of the invention which is utilized by the apparatus of the preferred embodiment hereinbefore described. The method of cleansing hydrocarbon contaminants from soil (5) utilized by the preferred embodiment is to place contaminated soils (1) on a conveyor (3) and to preheat the contaminated soils with the exhaust (44) from a heater (40) through the exhaust nozzles (64), then to place the preheated soils (5) on a conveyor (7) onto which steam from the heater (40) is injected (8) vaporizing all hydrocarbons, evacuating (9) the resultant hydrocarbon and water vapors, then placing the cleaned soils (12) into a clean product sump area (11), then removing the cleaned, decontaminated soils (12). The method provides that the dirty water is removed from the clean product sump area (11) and cleaned by insertion into, first, one or more particle separators (21, 23) and, second, into one or more particle filters (32, 34) before being placed into a feed water tank (36) for reuse by the heater (40). The method further provides that the particles separated from the dirty water be placed (28, 29) into the clean product sump area (11) with the cleaned, decontaminated soils (12). The method further provides that the vapors (9) of water and hydrocarbons evacuated from the conveyor (7) onto which steam (8) was injected be condensed into water (54), which may be placed into the feed water tank (36) for reuse by the heater (40), and hydrocarbons (55), which may be utilized by the heater (40) as a fuel source. The method finally provides that the water in the feed water tank (36) be fed into the heater (40) and converted into steam.

This invention has been described in terms of a single preferred embodiment, however, numerous embodiments are possible without departing from the essential characteristics thereof. Accordingly, the description has been illustrative and not restrictive as the scope of the invention is defined by the appended claims, not by the description preceding them, and all changes and modifications that fall within the stated claims or form their functional equivalents are intended to be embraced by the claims.

What is claimed is:

1. Apparatus for removal of hydrocarbons from soil and gravel comprising:
   a conveyor onto which the contaminated soil and gravel is placed and onto which steam is injected; a water separation sump which separates the cleaned soil and gravel output from said conveyor from the water resultant from the condensation of said steam;
   one or more particle separators which remove particulate matter from said water removed from said water separation sump; one or more particle filters which remove fine particulate matter from said water removed from said particle separators;

a feed water tank into which said water removed from said particle filters is placed;

a heater which utilizes hydrocarbons as fuel and which converts said water removed from said feed water tank into said steam;

an evacuator which removes from said conveyor the water and hydrocarbon vapor which results from injection of said steam onto said conveyor;

a condenser which condenses said water and hydrocarbon vapor output from said evacuator;

a separation tank in which the output of said condenser is permitted to sit and separate into its constituent components, condensed water and liquid hydrocarbons;

a connection from the output of said separation tank through which said liquid hydrocarbons are fed to the fuel input of said heater; and a connection from the output of said separation tank through which said condensed water is fed to said feed water tank.

2. Apparatus for removal of hydrocarbons from soil and gravel comprising:

a conveyor onto which the contaminated soil and gravel is placed and onto which steam is injected; a water separation sump which separates the cleaned soil and gravel output from said conveyor from the water resultant from the condensation of said steam;

one or more particle separators which remove particulate matter from said water removed from said water separation sump;

one or more particle filters which remove fine particulate matter from said water removed from said particle separators;

a feed water tank into which said water removed from said particle filters is placed;

a heater which utilizes hydrocarbons as fuel and which converts said water removed from said feed water tank into said steam;

an evacuator which removes from said conveyor the water and hydrocarbon vapor which results from injection of said steam onto said conveyor;

a preheater for said contaminated soils and gravel which utilizes the exhaust from said heater as a heat source;

a condenser which condenses said water and hydrocarbon vapor output from said evacuator;

a separation tank in which the output of said condenser is permitted to sit and separate into its constituent components, condensed water and liquid hydrocarbons;

a connection from the output of said separation tank through which said liquid hydrocarbons are fed to the fuel input of said heater; and a connection from the output of said separation tank through which said condensed water is fed to said feed water tank.

* * * * *